Aug. 17, 1926.
A. T. HOOPER
1,596,182
FORCE FEED GREASE GUN
Filed May 27, 1924
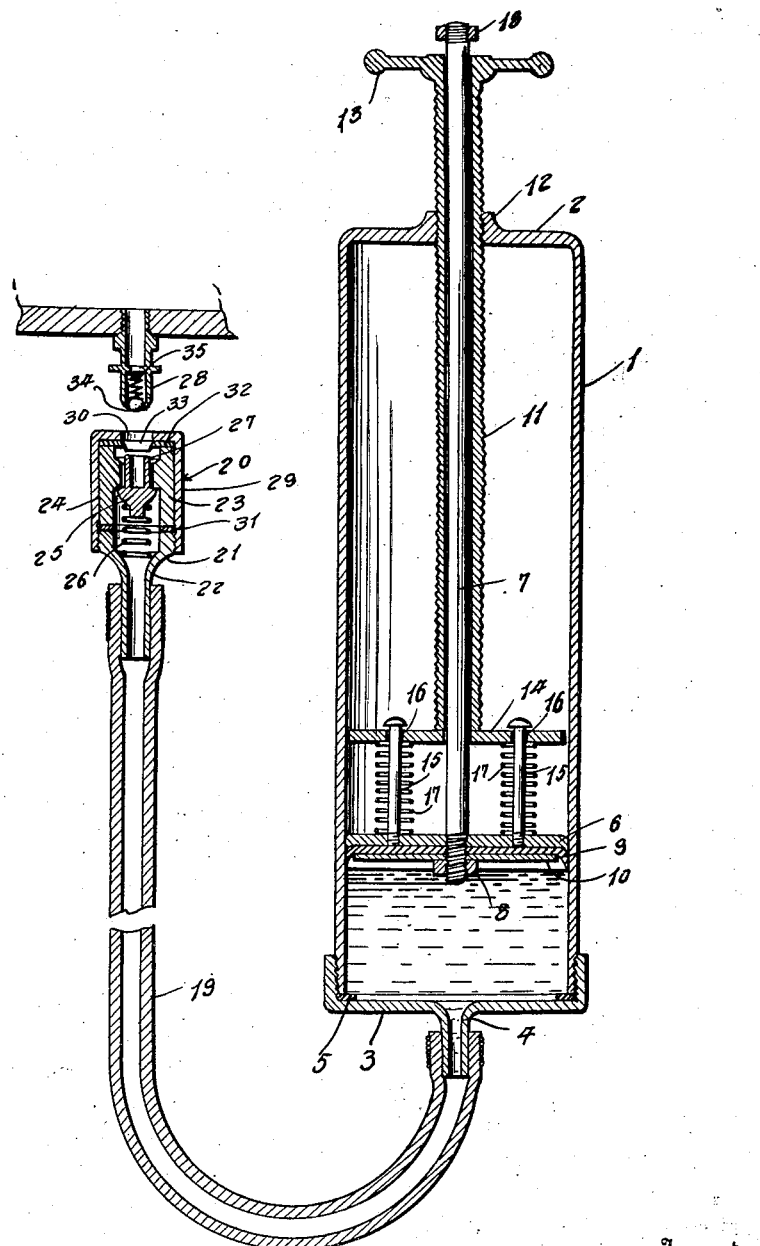
Inventor
A. T. Hooper,
By [signature]
Attorney Patented Aug. 17, 1926.

1,596,182

UNITED STATES PATENT OFFICE.

ALBERT T. HOOPER, OF VANCOUVER, BRITISH COLUMBIA, CANADA.

FORCE-FEED GREASE GUN.

Application filed May 27, 1924. Serial No. 716,244.

This invention relates to devices of that type through the medium of which grease or other lubricant is forced through valved tubes into bearings, such for instance as the bearings of an automobile, and in which the pressure employed to force the grease or other lubricant through the valved tubes into the bearings is developed, after the device has been applied to the valved tubes, by manipulating a screw swiveled to the piston and threaded in the cap of the barrel of the device.

The present invention has for one of its objects the provision of a grease gun of the character stated adapted to permit the grease or other lubricant propelling force to be easily and quickly developed before the application of the gun to the valved tubes, whereby to reduce to the minimum the work and time required to lubricate the bearings of an automobile.

A further object of this invention is the provision of a novel nozzle adapted to permit the grease or other lubricant propelling force to be developed and maintained until the application of the gun to a valved tube, and adapted after the application of the gun to permit the developed force to propel the grease or other lubricant through the valved tube into the bearing with which it is connected.

With the above and other objects in view, the invention consists in the construction, combination and arrangement of parts hereinafter fully described and claimed, and illustrated in the accompanying drawing, wherein:

The figure is a central longitudinal sectional view of a grease gun constructed in accordance with my invention, and of a valved grease tube such as commonly employed in connection with the bearings of an automobile.

Referring to the drawing by reference numerals, 1 designates the barrel of a grease gun the rear end 2 of which is preferably formed integrally therewith and the front end of which is closed by a cap 3 having screw threaded engagement therewith and provided with a discharge nipple 4. A gasket 5 positioned between the front end of the barrel 1 and the circular wall of the cap 3, establishes a leak proof connection between the barrel and cap. A piston 6 is arranged within the barrel 1 and is secured to a piston rod 7 by a nut 8. A cup washer 9 is secured to the front side of the piston 6 by a plate 10 and the nut 8. A hollow stem 11 which is externally screw threaded throughout its entire length and which loosely receives the piston rod 7 passes through and engages the screw threaded wall of an opening 12 in the rear end 2. The stem 11 is provided at its outer end with a hand wheel 13 and bears at its inner end upon a follower 14 which is secured to the piston 6 by a plurality of bolts 15. The bolts 15 pass through openings 16 in the follower 14 and have threaded engagement with the piston 6, and they prevent these parts from having any relative rotary movements and limit the distance that the piston 6 may be moved forwardly with respect to the follower 14 under the influence of springs 17 which are mounted upon the bolts 15 between the follower and piston. The rear end of the piston rod 7 extends beyond the corresponding end of the stem 11. A nut 18 is mounted upon this end of the piston rod 7 and constitutes a stop for contact by the rear end of the stem 11 when the latter is turned to thread it out of the barrel 1 in order that such movement of the stem will move the piston 6, follower 14 and associated parts in the same direction, whereby to permit the piston 6 and the parts associated therewith to be moved into the rear end of the barrel 1 when it is desired to fill the barrel with grease or other lubricant.

A flexible tube 19 is secured at one end to the nipple 4 and is provided at its free end with a valved nozzle 20. The nozzle 20 comprises a body of hollow sectional construction, the inner section 21 of which is externally screw-threaded and provided with a nipple 22 secured to and within the free end of the tube 19. The outer section 23 of the nozzle body is provided with an inwardly facing seat 24 against which an inwardly opening valve 25 is normally held by a spring 26. The stem 27 of the valve 25 passes outwardly beyond the seat 24 for contact with the outer end of a valved grease tube 28 when the nozzle 20 is applied to the grease tube. The body sections 21 and 23 are secured together by a cap 29 which has threaded engagement with the body section 21 and which is provided in its outer end with an opening 30 for the reception of the outer end of the grease tube 28. A gasket 31 is positioned between the body sections 21 and 23 in order to establish a leak proof connection between these parts. A gasket 32, which is positioned between the outer ends of the cap 29 and body section 23 and which may be made of leather or any other suitable flexible material, is provided with an opening 33 for the reception of the outer end of the grease tube 28. The opening 33 is of such size and formation that a snug fit is established between the outer end of the grease tube 28 and the gasket 32 when the nozzle 20 is applied to the grease tube, in order to establish a leak proof connection between these parts. The grease tube 28 is of a well known construction. It is adapted to be threaded into the bearing to be lubricated, and includes a ball valve 34 normally held seated by a spring 35.

In practice, the barrel 1 is filled with grease or other lubricant and to adapt the barrel to be filled it is only necessary to remove the cap 3 and move the piston 6 into the rear end of the barrel. After the barrel 1 is filled, the cap 3 is applied thereto, and the stem 11 turned into the barrel by rotating it through the medium of the hand wheel 13. This may be readily done by grasping the barrel in one hand and turning the stem 11 with respect to the barrel with the other hand. The piston 6 will move forwardly in the barrel 1 until the flexible tube 19 is full of grease or other lubricant, after which, due to the fact that the valve 25 seats outwardly, the piston will be held against further forward movement with respect to the barrel. By continuing the turning of the stem 11, the follower 14 will be caused to move in the direction of the piston 6 with the result that the springs 15 are placed under tension. The tension under which the springs 15 is placed may be determined by noting the distance that the rear end of the stem 11 has been moved from the nut or stop 18. The gun is now ready for use. By applying the nozzle 20 to the grease tube 28, the valve 25 is unseated, permitting the lubricant to pass through the nozzle and grease tube into the bearing. After the bearing has been supplied with the desired quantity of lubricant, the nozzle 20 is removed fom the grease tube, 28, and after its removal the valve 25 is promptly seated by the spring 26. The grease gun is now ready for use in lubricating another bearing.

From the foregoing description, taken in connection with the accompanying drawing, it should be apparent that since sufficient pressure may be built up in the barrel 1 to overcome the tension of the spring 35 and the resistance offered by the bearing to the passage of the lubricant therethrough, before the application of the nozzle to a grease tube, the parts of an automobile may be readily and easily lubricated. While I prefer to use four springs between the follower 14 and piston 6, it should be understood that any desired or required number may be used.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A grease gun including a nozzle having inner and outer sections, the inner section being provided with a nipple and externally screw threaded, the outer section being provided with an inwardly facing seat, a valve positioned on said seat, a spring interposed between the valve and the inner section, and a cap embracing the sections and having threaded engagement with the inner section and contacting with the outer end of the outer section.

2. A grease gun including a nozzle having inner and outer sections, the inner section being provided with a nipple and externally screw threaded, the outer section having an inwardly facing seat, a washer positioned between the sections, a washer positioned against the outer end of the outer section, a valve positioned on said seat, a spring interposed between the valve and inner section, and a cap embracing said sections and having threaded connection with the inner section and contacting with the outer end of the outer section, said cap also retaining the washers in place.

In testimony whereof I affix my signature.

ALBERT T. HOOPER.